(12) United States Patent
Green et al.

(10) Patent No.: US 7,478,544 B2
(45) Date of Patent: Jan. 20, 2009

(54) METHOD AND APPARATUS FOR LUBRICATING MOLTEN GLASS FORMING MOLDS

(75) Inventors: Thomas G. Green, Sylvania, OH (US); D. Wayne Leidy, Perrysburg, OH (US); Adam W. Stienecker, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 376 days.

(21) Appl. No.: 11/028,910

(22) Filed: Jan. 3, 2005

(65) Prior Publication Data

US 2006/0144088 A1 Jul. 6, 2006

(51) Int. Cl.
*C03B 35/00* (2006.01)
(52) U.S. Cl. .............................. 65/26; 65/169; 427/446; 427/133; 431/258
(58) Field of Classification Search ............... 65/26, 65/169; 427/446, 133, 248.1, 249.6, 450; 431/258, 132
See application file for complete search history.

(56) References Cited

U.S. PATENT DOCUMENTS

| | | | |
|---|---|---|---|
| 1,340,902 A | 5/1920 | Lundgaard |
| 3,339,615 A | 9/1967 | Brown |
| 3,617,233 A | 11/1971 | Mumford |
| 3,936,286 A | 2/1976 | Dunkailo |
| 4,077,761 A | 3/1978 | Dollinger et al. |
| 4,248,201 A | 2/1981 | Tsutsui et al. |
| 4,412,974 A | 11/1983 | Nicolas et al. |
| 4,498,918 A | 2/1985 | Seeman |
| 4,806,137 A | 2/1989 | Virey |
| 5,197,448 A | 3/1993 | Porreca et al. |
| 5,402,766 A | 4/1995 | Tsuchiya et al. |
| 5,679,409 A | 10/1997 | Seeman |
| 5,746,800 A | 5/1998 | Ambrogio |
| 5,958,099 A | 9/1999 | Morettin |

(Continued)

FOREIGN PATENT DOCUMENTS

EP 0393 554 A2 3/1990

(Continued)

OTHER PUBLICATIONS

International Search Report, mailed Jun. 22, 2006.

(Continued)

*Primary Examiner*—Mark Halpern

(57) ABSTRACT

A surface mixing burner (16) is positioned in alignment with a mold of a glass container forming machine of the I.S. type to produce a supply of soot to lubricate an inner surface of the mold, the soot being produced by combustion of a rich, combustible supply of a fuel and an oxidant. The supply of fuel and oxidant is intermittently ignited by a sparking device (54) that is positioned within a sooting head (10), and an ignition coil (56) is positioned within the sooting head to deliver a high voltage pulse to the sparking device by the inductive discharge method. The ignition coil is positioned sufficiently close to the sparking device, and preferably in direct contact therewith, to avoid interference with the proper operation of an electronic control system for the I.S. machine. A remotely-positioned power supply (62) is provided to energize the ignition coil, the power supply providing power to the ignition coil at a relatively low voltage, for example, 12-24 volts d.c.

2 Claims, 3 Drawing Sheets

U.S. PATENT DOCUMENTS

| | | | |
|---|---|---|---|
| 6,068,889 | A | 5/2000 | Seeman |
| 6,098,427 | A | 8/2000 | Kirkman |
| 2003/0175424 | A1 | 9/2003 | Seeman |
| 2003/0221455 | A1 | 12/2003 | Scott |

FOREIGN PATENT DOCUMENTS

| | | | |
|---|---|---|---|
| EP | 0561203 | * | 9/1993 |
| JP | 03-153509 | | 7/1991 |

OTHER PUBLICATIONS

M. Melito, Car Ignition With IGBTS.

* cited by examiner

METHOD AND APPARATUS FOR LUBRICATING MOLTEN GLASS FORMING MOLDS

FIELD OF THE INVENTION

This invention relates to a method of and an apparatus for lubricating a mold of a glass forming machine by depositing soot therein, the soot resulting from the intermittent ignition of a rich, combustible mixture of oxygen and a combustible fuel as a result of a spark delivered by a sparking device. More particularly, this invention relates to a method and apparatus of the foregoing character in which the mold is a mold of a glass container forming machine of the individual section (I.S.) type.

BACKGROUND OF THE INVENTION

As is known, for example, from U.S. Pat. No. 5,746,800 (Ambrogio) or U.S. Pat. No. 5,679,409 (Seeman), it is desirable to lubricate a molten glass contacting surface of a glass manufacturing machine, for example, an internal surface of a forming mold of such a machine, with a thin layer of carbon soot as a substitute for periodically brushing such a surface with a conventional oil and graphite-based mold dopant. Such a soot coating is obtained by the partial oxidation of a carbonaceous gas, such as acetylene or a mixture of an acetylene-based gas, such as methacetylene and propadiene (occasionally referred to as mapp gas or as MAPD gas) by way of a burner whose flame is directed towards the mold surface to be coated.

The aforesaid Seeman '409 patent describes a mold surface soot-coating system in which a mixture of MAPD gas and oxygen, after igniting by a natural gas-derived pilot flame, is directed toward a surface to be coated. As noted in Seeman '409, because of the inherently intermittent nature of the operation of a soot burner in a glass manufacturing machine, a mixture of MAPD gas and oxygen must be carefully controlled so as to prevent backfiring of the flame from the burner into the burner nozzle (column 3, lines 9-20), and it is understood that the system of the Seeman '409 patent has proven to be capable of operating in a successful manner in sooting glass-making molds of a Hartford 28 rotary tableware glass forming machine, where a single sooting burner can service all molds on a rotating table. In that regard, the pulse rate of a sooting burner for a Hartford 28 tableware machine occurs at a fairly high frequency, and any tendency for backfiring to occur by the backflow of oxygen into the fuel line through an air-fuel mixer can be avoided by careful control of the operating conditions of the sooting apparatus.

The Hartford 28 glass making machine does not lend itself to the manufacture of hollow glass containers with restricted openings, however, such as the containers used in packaging various food and beverage products, because such products must be manufactured on a machine with split molds. An individual section (I.S.) machine, for example, as described in commonly-assigned U.S. Pat. No. 6,098,427 (Kirkman), or U.S. Pat. No. 3,617,233 (Mumford), the disclosure of each of which is incorporated herein by reference, is a two-step forming machine type that operates with split glass-forming molds, and such a machine type is widely used in the manufacture of such containers. In view of the need to provide a separate sooting burner for each of the various machine sections of an I.S. machine, a sooting burner for an I.S. machine will operate much less frequently than one for a Hartford 28 machine. For that reason, heretofore it has not been possible to adapt a premix type burner of the type taught by the Seeman '409 patent to I.S. machine operation because of backfiring occurring as a result of backflow of oxygen from the fuel oxygen mixer into the fuel line during the relatively long durations between burner firing pulses.

The glass forming machine described in the aforesaid Ambrogio '800 patent, the disclosure of which is incorporated by references herein, corresponds to an individual section (I.S.) glass container forming machine. However, this reference teaches the use of a spark energization device, element 23, that is positioned away from the sooting head, and such positioning requires the use of well-shielded cables from the spark enegization device to the spark electrodes, elements 22, to prevent electromagnetic interference (EMI) in the cables from interfering with the operation of electronic control systems or other electrical elements of the glass forming machine.

Commonly-assigned Published U.S. Patent Application No. 2003-0221455A1 (Scott et al.), the disclosure of which is also incorporated by reference herein, teaches a sooting system for sooting molds of an I.S. glass forming machine. The aforesaid Scott et al. application specifically teaches the use of a surface mixing burner to intermittently separately emit streams of an oxidant and a carbonaceous fuel to be ignited by an electrical spark between spaced elements of an igniter at a location downstream of the surface mixing burner, to thereby inhibit backfiring resulting from mixing of oxidant and fuel in the oxidant or fuel lines during dwell periods between firing pulses. As previously mentioned, the potential problem of backfiring is more severe in the case of an I.S. machine than it is in the case of a Hartford 28 tableware glass forming machine, such as that to which the teachings of U.S. Pat. No. 6,068,889 (Seeman) is applicable, because the dwell periods between successive firing pulses are longer for an I.S. machine than for a Hartford 28 machine.

Whatever sooting system that is used in connection with an I.S. glass container forming machine, it is important that a very high voltage, for example, 12,000-15,000 volts, depending on the spacing between igniter electrodes, be used to fire the spaced igniter electrodes of an intermittently operated sparking device to properly ignite mixing oxidant and fuel streams, or a previously-mixed mixture thereof, to produce soot therefrom. Such a voltage is produced from a conventional power supply, for example, 12-24 volts d.c., by an electronic element that converts the lower voltage power supply to the higher voltage that is needed to intermittently operate the sparking device. This may be done by a capacitive discharge method, in which a spark is produced by shorting a capacitor with a predetermined level of stored energy. It may also be done by the inductive generation method, in which a high voltage inductive spike is generated when current flow through the primary of a transformer is interrupted; this will cause the secondary side to multiply the voltage into a pulse that will be between 20 k and 35 k volts, based on the turns ratio. For purposes of a glass-forming machine sooting system, an inductive discharge sparking system is advantageous in that it results in somewhat lower peak amperage pulses, for example, approximately 6 amps versus as high as 100 amps for a capacitive discharge igniter, and this presents a lower safety risk to nearby workers.

Because the physical environment around the molds of an I.S. glass container forming machine is crowded, heretofore it was not known to install a high voltage source for a sparking device close to the machine molds to be lubricated. When the high voltage source is positioned remotely from the machine molds, unduly long electrical cables are needed to conduct a high voltage sparking pulse from the low voltage source. This tends to be operationally troublesome in that the high voltage cables, when unduly long, produce excessive levels of electromagnetic interference (EMI), which can not be adequately shielded because such shielding, over a long cable, adds excessive capacitance to the spark, thereby reducing the voltage across the sparking gap to a level that may be too low. This problem is compounded in a sooting system for an I.S. machine when such machine is operated on a multiple cavity basis, that is, on a basis where multiple molds are provided to simultaneously produce 2, 3 or 4 containers at each machine section, because it is necessary to provide a sooting head for each of the molds at each of the machine sections, and EMI from the cable to each sooting head can interfere with the operation of the forming machine's electronic control system, especially if the sparking devices for the sooting heads are fired in overlapping pulses.

BRIEF DESCRIPTION OF THE INVENTION

According to the present invention, a very high voltage pulse, for example, of at least 15,000 volts, is intermittently provided to spaced igniter elements of a sparking device for a sooting head that is disposed in proximity to a mold of an I.S. glass container forming machine. The sparking voltage is provided by inductive discharge device that is embedded within the sooting head, directly connected to spaced sparking electrodes of the sparking device, although the use of a capacitive discharge device is also contemplated. The inductive discharge device of the present invention receives a relatively low voltage supply, for example, a 12-24 volt pulsed d.c., supply from a power supply, by cables from a remote electrical panel and delivers this low voltage supply to a coil for each machine cavity that positioned immediately above the spark plug for such cavity. Because the cables from the electrical panel to the sparking device operate at a relatively low voltage, they do not need to be well-shielded to prevent them from emitting a level of EMI that could interfere with the operation of the forming machine electronic control system or any nearby sooting heads, in spite of any normal spacing between the electrical panel and the sparking device transformer.

By embedding the inductive discharge device within the sooting head in which it is intended to operate, the length of the high voltage lines is very small, which minimizes undesired EMI within the sooting head or with nearby sooting heads. Further, in a multiple sooting head arrangement, for example, an arrangement for a "quad" I.S. machine (namely, one that simultaneously produces four containers at each machine section), which will require 4 sooting heads for each machine section, the machine operating cycle provides sufficient time to fire these sparking devices without any overlap in the spark pulses for the various sooting heads, and this further serves to prevent a spark pulse for any sooting head from interfering with the operation of a sparking device for any nearby sooting head.

Accordingly, it is an object of the present invention to provide an improved method and apparatus for applying soot to a mold of an I.S. glass container forming machine. More particularly, it is an object of the present invention to provide a method and apparatus of the aforesaid character that is capable of operating on an intermittent basis without producing excessive levels of electromagnetic interference, and of doing so without the requirement of being able to operate over a wide range of pulse frequencies.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
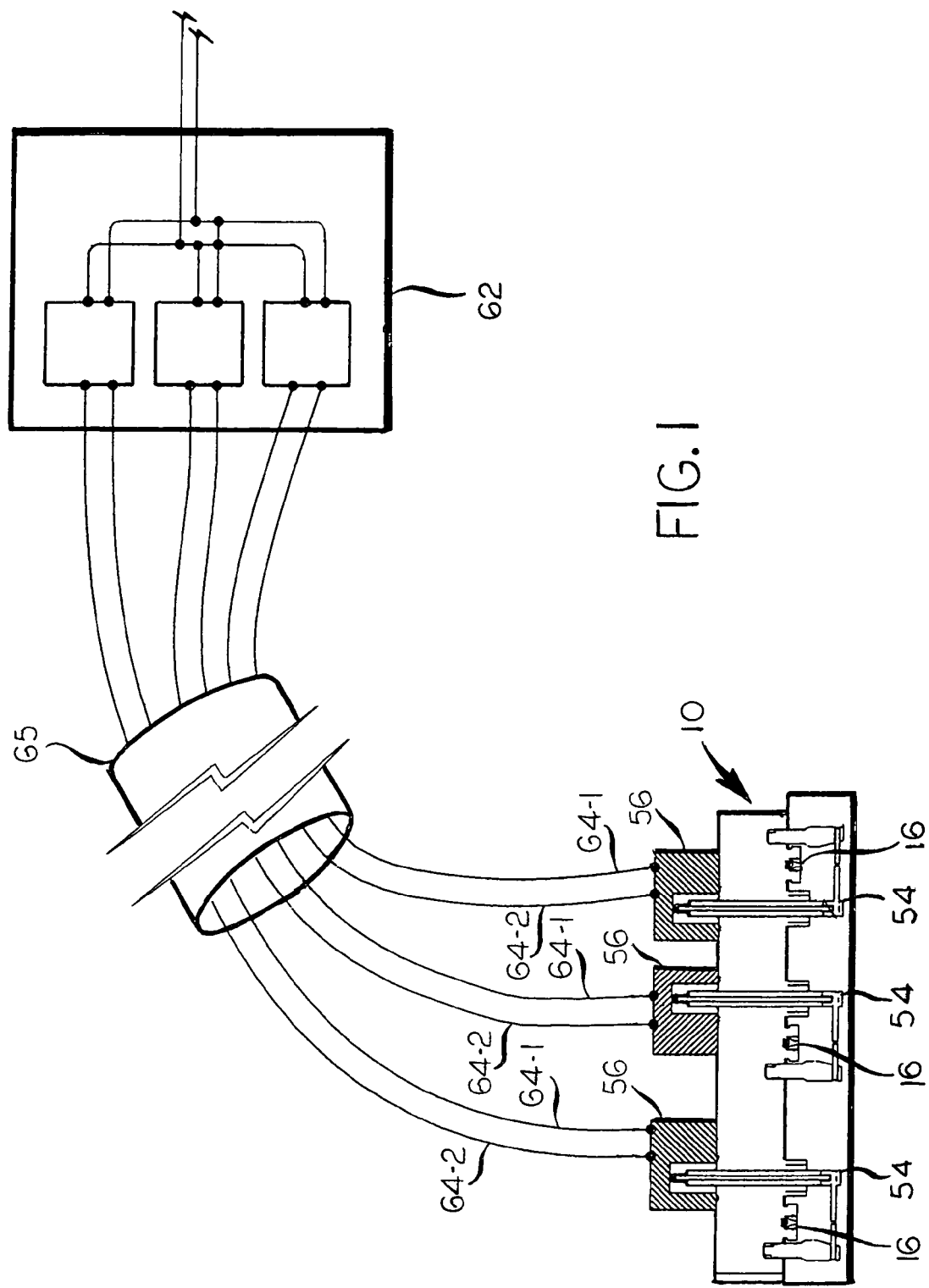
FIG. 1 is a schematic view of an electrical system for use with apparatus according to the present invention for use in the practice of a method of the present invention.
Figure 2:
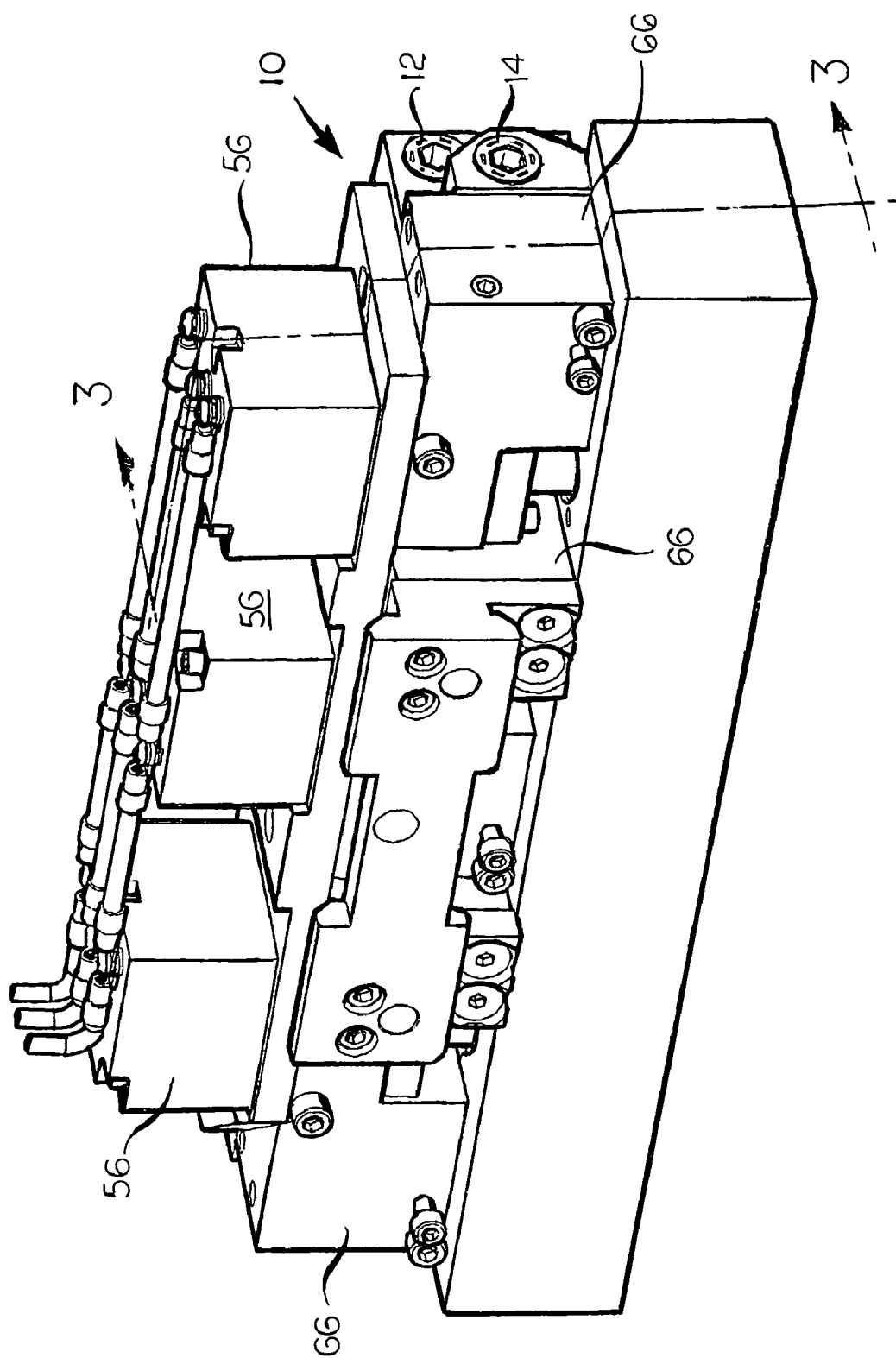
FIG. 2 is a perspective view, of a head for a triple gob glass container forming machine according to a preferred embodiment of the present invention.
Figure 3:
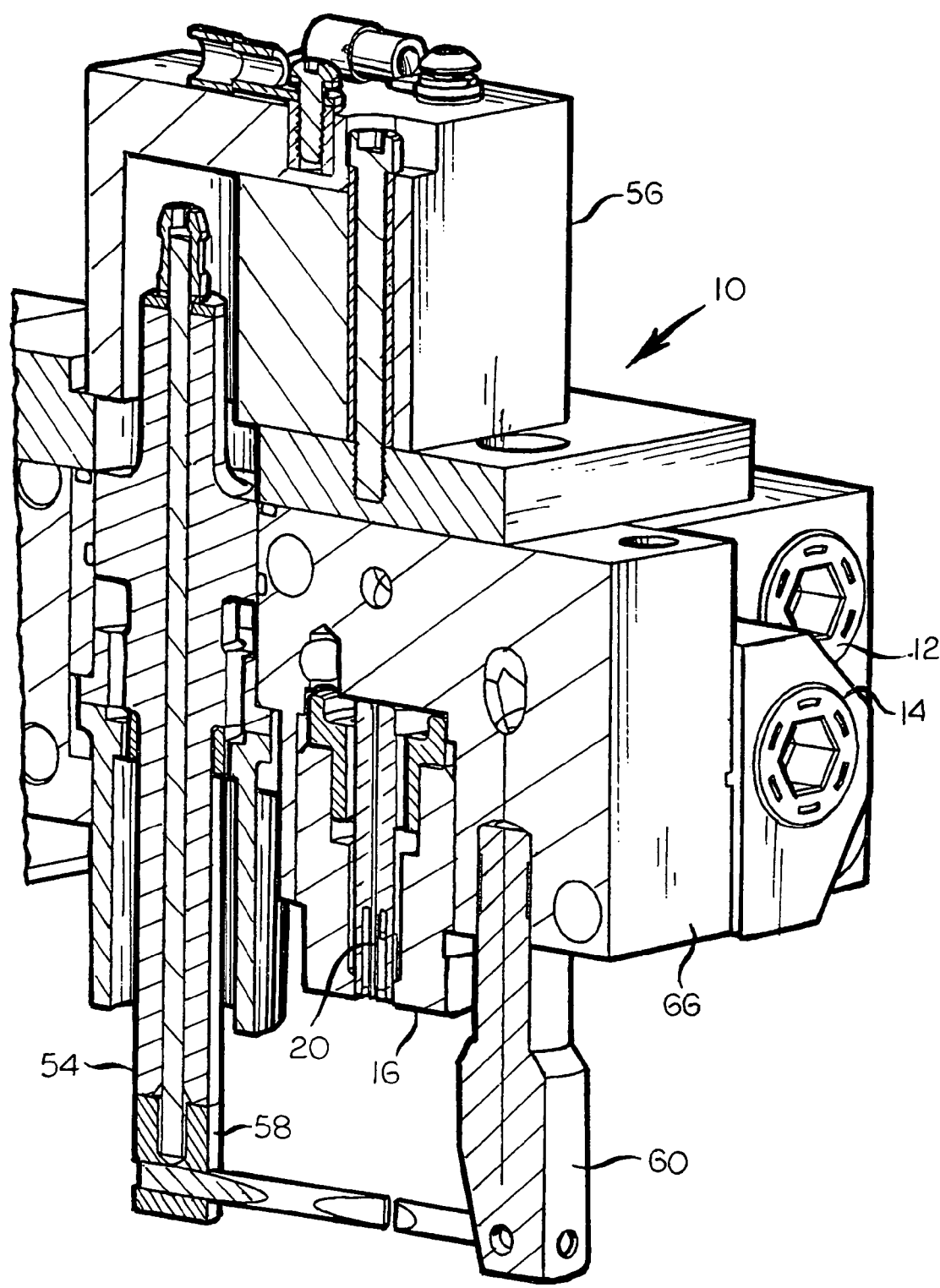
FIG. 3 is a fragmentary, perspective view in cross-section and at a enlarged scale, taken on line 3-3 of FIG. 2.

A glass-contacting mold surface sooting device according to the present invention is illustrated generally by reference numeral 10 in FIGS. 1 and 2. The sooting device 10 receives a fuel through an inlet 12 and an oxidant through an oxidant inlet 14. A pressurized oxidant from a source (not shown) is delivered to the inlet 14, and a pressurized fuel from a source (not shown) is delivered to the inlet 12. The oxidant delivered to the inlet 14 is preferably relatively pure oxygen, such as bottled oxygen from a commercial source, although the use of an oxygen-enriched air supply is also contemplated. The fuel delivered to the inlet 12 is preferably mapp gas (a mixture of methyl acetylene and propadiene). Oxidant from the inlet 14 is delivered to a burner 16 of the surface mixing type through an oxidant passage 18, and fuel from the inlet 12 is delivered to the burner 16 through a fuel passage 20. Though only one burner 16 is shown in FIG. 3, it is to be understood that there will be a burner for each cavity of each section of an I.S. glass container forming machine, for example, three burners at each section of a triple gob I.S. machine, as shown in FIG. 1, or four burners at each section of a "quad" I.S. machine.

The fuel and oxidant flowing from the burner 16, as received from the oxidant passage 18 and the fuel passage 20, will immediately begin to mix as they exit from the burner 16. Shortly thereafter, the at least partly mixed fuel and oxidant, which will at least mix by the turbulence associated with their flow in conjunction with normal molecular diffusion, will form a combustible mixture, and the combustible mixture will be ignited by a spark from an inductive discharge spark igniter 54, which is embedded within the sooting head with which the burner 16 is associated, and at a location downstream of an inlet from the burner 16, as will be hereinafter explained more fully.

The spark igniter 54 sends a high voltage pulse to one or another of a pair of spaced electrodes 58, 60 from a coil 56. The spark igniter 54 receives relatively low voltage electrical power, for example, 12-24 volts d.c. on a pulsed basis, from a remote electrical panel 62 through spaced wires 64-1, 64-2, one such set of spaced wires for each spark igniter 54, the wires 64-1, 64-2 extending through a wires 65 whose overall length is approximately 8-10 feet. Because the wires 64-1, 64-2 are operating at a low voltage, they do not emit EMI noise at a level that could interfere with the proper operation of an electronic control system for an I.S. machine with which the head 10 is associated. As is shown in FIG. 2, the surface mixing sooting burner 16, which corresponds to that identified by reference numeral 216 in the aforesaid Scott '455 Published Application, is positioned with its longitudinal central axis coaxial with a longitudinal central axis of a glass manufacturing mold (not shown), with only a short distance between an outlet from the burner 16 and an inlet to such mold. Due to rapid mixing of oxidant and fuel streams from the burner 16, flame from the burner 16 will contact all portions of the inside, molten glass contacting surfaces of the mold, for effective sooting of all such portions, even those at or very near the inlet to the mold.

Inductive discharge ignition is known as an ignition system for operating automotive spark plugs, as is described in a 1999 ST Microelectronics publication entitled "Application Note—Car Ignition With IGBTS" by M. Melito, the disclosure of which is incorporated by reference herein. Of course, an automotive spark ignition system must be capable of operating over a wide range of firing pulses, whereas a spark ignition system for a glass container sooting system need only be able to operate at a fixed or relatively fixed firing pulse rate. In the present case, it is preferred that the ignition coils 56 fire at a fixed rate of 4000 pulses per minute.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited only by the terms of the following claims and the legal equivalents thereof.

We claim:

1. Apparatus for use with a section of a glass container forming machine of the I.S. type, the section comprising a plurality of blank molds each of which serves to form a parison of a glass container from moldable glass by pressing or blowing, the apparatus comprising:
   a plurality of sooting heads each having a burner positioned to intermittently deliver pulses of a rich, combustible supply of a fuel and an oxidant to flow toward one of the blank molds;
   a plurality of sparking devices, each sparking device being positioned to intermittently ignite the combustible supply of fuel and oxidant to produce a sooty flame;
   an ignition coil positioned within each sooting head to intermittently energize the sparking device with high voltage while avoiding interference with the proper operation of an electronic control system for the I.S. machine, and
   means for delivering relatively low voltage power supply to each said ignition coil.

2. Apparatus according to claim 1 and further comprising:
   an electrical panel for delivering a relatively low voltage power supply to each ignition coil, said electrical panel being positioned remotely from said burners.

* * * * *